US012500357B2

(12) United States Patent
Lin et al.

(10) Patent No.: US 12,500,357 B2

(45) Date of Patent: Dec. 16, 2025

(54) ANTENNA ASSEMBLY AND ELECTRONIC DEVICE

(71) Applicant: REALME CHONGQING MOBILE TELECOMMUNICATIONS CORP., LTD., Chongqing (CN)

(72) Inventors: Siying Lin, Chongqing (CN); Yuanbin Xiang, Chongqing (CN)

(73) Assignee: REALME CHONGQING MOBILE TELECOMMUNICATIONS CORP., LTD., Chongqing (CN)

(*) Notice: Subject to any disclaimer, the term of this patent is extended or adjusted under 35 U.S.C. 154(b) by 85 days.

(21) Appl. No.: 18/435,826

(22) Filed: Feb. 7, 2024

(65) Prior Publication Data

US 2024/0178577 A1 May 30, 2024

Related U.S. Application Data

(63) Continuation of application No. PCT/CN2022/114648, filed on Aug. 25, 2022.

(30) Foreign Application Priority Data

Sep. 13, 2021 (CN) ......................... 202111069517.2

(51) Int. Cl.
*H01Q 21/28* (2006.01)
*H01Q 1/24* (2006.01)

(52) U.S. Cl.
CPC ............. *H01Q 21/28* (2013.01); *H01Q 1/241* (2013.01)

(58) Field of Classification Search
CPC ........ H01Q 1/241; H01Q 1/243; H01Q 21/28; H01Q 21/29; H01Q 21/30; H01Q 5/307; H01Q 9/0421; H01Q 9/42
See application file for complete search history.

(56) References Cited

U.S. PATENT DOCUMENTS

2016/0352014 A1 12/2016 Chen et al.
2022/0344823 A1* 10/2022 Panther ................. H01Q 21/26
(Continued)

FOREIGN PATENT DOCUMENTS

CN 106790795 A 5/2017
CN 109103569 A 12/2018
(Continued)

OTHER PUBLICATIONS

WIPO, International Search Report for PCT Application No. PCT/CN2022/114648, Nov. 21, 2022.
(Continued)

*Primary Examiner* — Thien M Le

(74) *Attorney, Agent, or Firm* — Sheppard, Mullin, Richter & Hampton LLP

(57) ABSTRACT

Provided are an antenna assembly and an electronic device. The antenna assembly includes a housing, a radio frequency circuit, a first antenna, a second antenna, and a third antenna. The first, second and third antennas are provided on the housing. The first antenna radiates a first radio frequency signal at a GPS frequency band L1, and each of the second and third antennas radiates a second radio frequency signal at a GPS frequency band L5. A first GPS module of the radio frequency circuit is connected with the first antenna and supports receipt and transmission of the first radio frequency signal. A second GPS module of the radio frequency circuit is selectively connected to one of the second and third antennas, and switch, based on network information of a received second radio frequency signal, between being connected to the second antenna and being connected to the third antenna.

20 Claims, 8 Drawing Sheets

(56) References Cited

U.S. PATENT DOCUMENTS

| | | | | |
|---|---|---|---|---|
| 2022/0361814 | A1* | 11/2022 | Hinkola | A61B 5/1112 |
| 2022/0368032 | A1* | 11/2022 | Kaufmann | H01Q 1/38 |
| 2022/0394934 | A1* | 12/2022 | Jung | A01G 9/20 |
| 2022/0397682 | A1* | 12/2022 | Saunders | G01S 19/06 |
| 2022/0416401 | A1* | 12/2022 | Son | H01Q 1/273 |
| 2023/0006335 | A1* | 1/2023 | Yang | H01Q 1/38 |
| 2023/0006360 | A1* | 1/2023 | Yang | H01Q 1/243 |
| 2023/0083466 | A1* | 3/2023 | Li | H01Q 13/10 343/720 |
| 2023/0088794 | A1* | 3/2023 | Pandey | H01Q 9/04 343/702 |
| 2023/0093645 | A1* | 3/2023 | Yang | H01Q 21/30 |

FOREIGN PATENT DOCUMENTS

| | | | |
|---|---|---|---|
| CN | 109728443 | A | 5/2019 |
| CN | 208873875 | U | 5/2019 |
| CN | 210607607 | U | 5/2020 |
| CN | 211957929 | U | 11/2020 |
| CN | 112216965 | A | 1/2021 |
| CN | 110994156 | B | 6/2021 |
| JP | 2008278059 | A | 11/2008 |

OTHER PUBLICATIONS

CNIPA, First Office Action for CN Application No. 202111069517.2, Feb. 20, 2023.

CNIPA, Second Office Action for CN Application No. 202111069517.2, Aug. 30, 2023.

CNIPA, Office Action issued for CN Application No. 202111069517.2, Jan. 25, 2024.

EPO, Search Report for EP Application No. 22866425.6, Nov. 5, 2024.

* cited by examiner

ANTENNA ASSEMBLY AND ELECTRONIC DEVICE

CROSS-REFERENCE OF RELATED APPLICATIONS

The present disclosure is a continuation of International Application No. PCT/CN2022/114648 filed Aug. 25, 2022, which claims priority to Chinese Patent Application No. 202111069517.2 filed Sep. 13, 2021. The above-mentioned applications are hereby incorporated by reference in their entireties.

TECHNICAL FIELD

The present disclosure relates to the technical field of antennas, and in particular to an antenna assembly and an electronic device.

BACKGROUND

Statements herein merely provide background information related to the present disclosure, and they not necessarily constitute exemplary prior art.

As users increasingly use global positioning system (GPS) to navigate, requirements for navigation are getting higher and higher. Especially, for walking navigation, requirements for positioning accuracy are getting higher and higher.

In a conventional antenna assembly, in order to achieve a function of precise positioning, a dual-band GPS antenna (for example, involving a GPS L1 antenna and a GPS L5 antenna) is generally used for the positioning. In the related art, one antenna is generally shared by both a L1 frequency band and a L5 frequency band. However, in this manner, performance of the L1 antenna and performance of L5 antenna cannot be considered simultaneously, thereby greatly affecting the positioning accuracy.

SUMMARY

Embodiments of the present disclosure provide an antenna assembly and an electronic device.

In a first aspect, the embodiments of the present disclosure provide an antenna assembly. The antenna assembly includes a housing, a radio frequency circuit, a first antenna, a second antenna and a third antenna, where the first antenna, the second antenna and the third antenna are provided on the housing. The first antenna is configured to radiate a first radio frequency signal at a Global Position System (GPS) L1 frequency band, and each of the second antenna and the third antenna is configured to radiate a second radio frequency signal at a GPS L5 frequency band.

The radio frequency circuit includes a first GPS module and a second GPS module.

The first GPS module is connected with the first antenna, and configured to support receipt and transmission of the first radio frequency signal.

The second GPS module is switchable between being connected to the second antenna and being connected to the third antenna, and is configured to determine a target antenna based on network information of a received second radio frequency signal, and control a radio frequency path between the target antenna and the second GPS module to be turned on, where the target antenna is one of the second antenna and the third antenna.

In a second aspect, the embodiments of the present disclosure provide an antenna assembly. The antenna assembly includes a housing, a first antenna, a second antenna, a third antenna and a GPS module. The first antenna, the second antenna and the third antenna are provided on the housing; the first antenna is configured to radiate a first radio frequency signal at a GPS L1 frequency band, and each of the second antenna and the third antenna is configured to radiate a second radio frequency signal at a GPS L5 frequency band. The GPS module is switchable between being connected to the second antenna and being connected to the third antenna. The GPS module is configured to determine a target antenna from the second antenna and the third antenna based on network information of a received second radio frequency signal, and control a radio frequency path between the target antenna and the GPS module to be switched on for radiation of the second radio frequency signal.

In a third aspect, the embodiments of the present disclosure provide an electronic device. The electronic device includes a housing, a radio frequency circuit, a first antenna, a second antenna, a third antenna. The first antenna, the second antenna and the third antenna are provided on the housing; the first antenna is configured to radiate a first radio frequency signal at a GPS L1 frequency band, and each of the second antenna and the third antenna is configured to radiate a second radio frequency signal at a GPS L5 frequency band. The radio frequency circuit includes a first GPS module and a second GPS module. The first GPS module is connected with the first antenna, and configured to support receipt and transmission of the first radio frequency signal. The second GPS module is selectively connected to one of the second antenna and the third antenna, and configured to switch, based on network information of a received second radio frequency signal, between being connected to the second antenna and being connected to the second antenna.

The details of one or more embodiments of the present disclosure are set forth in the following figures and description. Other features, objects, and advantages of the present disclosure will become obvious from the description, drawings, and claims.

Other features and aspects of the disclosed features will become apparent from the following detailed description, taken in conjunction with the accompanying drawings, which illustrate, by way of example, the features in accordance with embodiments of the disclosure. The summary is not intended to limit the scope of any embodiments described herein.

BRIEF DESCRIPTION OF THE DRAWINGS

In order to more clearly explain technical solutions of the embodiments of the present disclosure or the related art, drawings used in the embodiments or the related art will be briefly introduced below. Obviously, the drawings as described below are merely some embodiments of the present disclosure. For those skilled in the art, other drawings can be obtained by those skilled in the art based on these drawings without inventive effort.

DETAILED DESCRIPTION OF PREFERRED EMBODIMENTS

Figure 1:
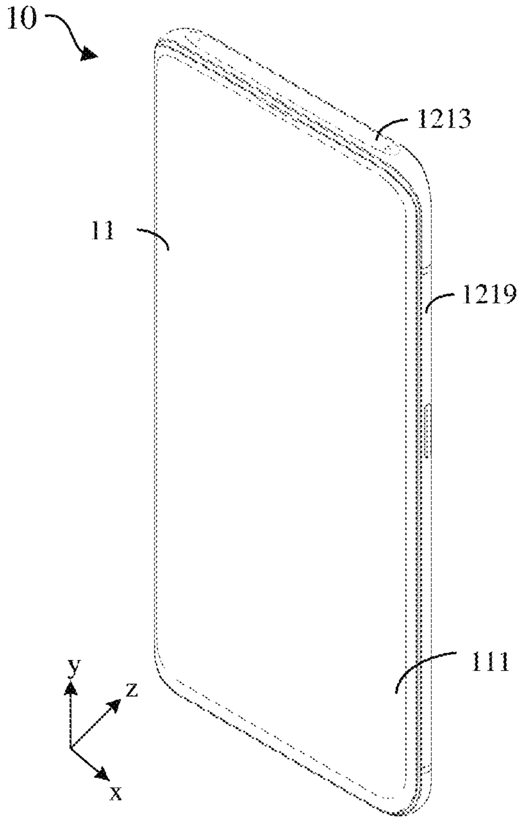
FIG. 1 is a front view of an electronic device according to an embodiment.

In order to make the above objects, features and advantages of the present disclosure more comprehensible, the technical solutions in the embodiments of the present disclosure will be clearly and comprehensively described below with reference to the accompanying drawings. Numerous specific details are set forth in the following description to facilitate a thorough understanding of the present disclosure. However, the present disclosure can be implemented in many other manners different from those described herein, and those skilled in the art can make similar improvements without departing from the scope of the present disclosure, and therefore the present disclosure is not limited by the specific embodiments disclosed below.

In the description of the present disclosure, it should be understood that the orientational or positional relationship indicated by terms, such as "center", "longitudinal", "transverse", "length", "width", "thickness", "upper", "lower", "front", "rear", "left", "right", "top", "bottom", "axial", "radial", and "circumferential", are based on orientational or positional relationship illustrated in the drawings, which is merely for the purpose of ease of describing the present disclosure and simplifying the description, and itis not intended to indicate or imply that the device or element referred to must have a specific orientation, or be constructed and operated in the specific orientation, therefore it cannot be understood as a limitation on the present disclosure.

Furthermore, the terms "first", "second" are merely for a descriptive purpose and cannot be understood as indicating or implying relative importance or implicitly indicating the number of technical features indicated. Thus, a feature defined by "first", or "second" may explicitly or implicitly indicate that at least one such feature is included. In the description of the present disclosure, "a plurality of"' means at least two, for example, two, three, or more, unless otherwise specified specifically.

In the present disclosure, unless specified and defined otherwise, terms such as "mount", "joint", "connect", "fix" and the like should be understood in a broad sense. For example, it may be a fixed connection, or may be detachable connection or integral; it may be a mechanical connection, or an electrical connection; it may be a direct connection, or may be an indirect connection through an intermediate medium, or may be internal communication between two elements or an interaction relationship between two elements, unless specifically defined otherwise. For those skilled in the art, the specific meaning of the above terms in the present disclosure may be understood based on specific situations.

In the present disclosure, unless specifically stated and defined otherwise, a first feature is "above" or "below" a second feature may be a case that the first feature is in direct contact with the second feature, or the first feature and the second feature are in indirect contact through an intermediate medium. Moreover, the first feature being "on", "over", and "above" the second feature may mean that the first feature is directly above or diagonally above the second feature, or merely indicate that level height of the first feature is higher than the level height of the second feature. The first feature being "under", "below" and "beneath" the second feature may mean that the first feature is directly below or diagonally below the second feature, or merely represents that level height of the first feature is less than the level height of the second feature.

In the antenna assembly and the electronic device provided in the embodiments of the present disclosure, a housing, a radio frequency circuit, a first antenna, a second antenna and a third antenna are included, where the first antenna, the second antenna and the third antenna are provided on the housing. The first antenna is configured to radiate a first radio frequency signal at a GPS L1 frequency band, and each of the second antenna and the third antenna is configured to radiate a second radio frequency signal at a GPS L5 frequency band. The radio frequency circuit includes a first GPS module and a second GPS module. The first GPS module is connected with the first antenna and configured to support receipt and transmission of the first radio frequency signal. The second GPS module is switchable between being connected to the second antenna and being connected to the third antenna, and is configured to determine a target antenna based on network information of a received second radio frequency signal, and control a radio frequency path between the target antenna and the second GPS module to be switched on. GPS antennas of two frequency bands are used in the antenna assembly, in which the first antenna is assisted by the second antenna and the third antenna, and the positioning accuracy can be improved. In addition, two GPS L5 antennas each configured to radiate a signal at the GPS L5 frequency band are provided, this can avoid a case in the related art that the GPS L5 antenna fails to work when the user holds the electronic device, and can effectively increase the radiation efficiency of the GPS L5 antenna. Therefore, the GPS positioning accuracy of the antenna assembly and the electronic device can be improved.

The antenna assembly in the embodiments of the present disclosure may be applied to an electronic device having a wireless communication function, and the electronic device may be a handheld device, a vehicle-mounted device, a wearable device, a computing device, or other processing device connected to a wireless modem, and various user equipment (UE) (for example, a mobile phone), a mobile station (MS), and the like. For convenience of description, the above-mentioned devices are all referred to as an electronic device.

Figure 2:
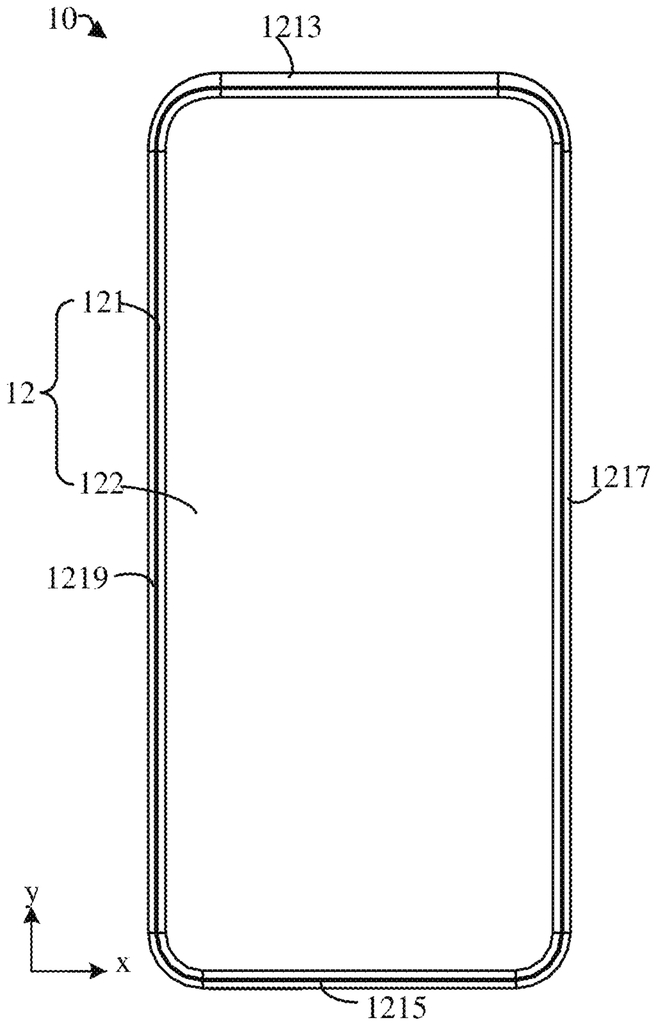
FIG. 2 is rear view of the electronic device illustrated in FIG. 1.

As illustrated in FIG. 1 and FIG. 2, in an embodiment, it is illustrated by taking, as an example, a case where the electronic device is a mobile phone. The electronic device includes a display screen assembly 11 and a housing 12. The housing 12 includes a frame 121 and a rear cover 123. The display screen assembly 11 includes a display screen 111. The display screen 111 may be an organic light-emitting diode (OLED) screen, or a liquid crystal display (LCD)

screen. The display screen 111 may be configured to display information and provide an interactive interface for a user. The display screen 111 may be in a rectangle shape or an arc-angle rectangle shape, and the arc-angle rectangle may sometimes be referred to as a rounded rectangle, that is, four corners of a rectangle each are of an arc for transition, and the four sides of the rectangle are generally straight segments.

The frame 121 may be made of a metal material such as an aluminum alloy, a magnesium alloy or stainless steel, or may be made of an insulating material such as plastic. The frame 121 is provided on a periphery of the display screen assembly 11 for supporting and protecting the display screen assembly 11. The display screen assembly 11 may be fixedly connected with the frame 121 through for example a dispensing process. The frame 121 may further extend towards the interior of the electronic device to form a middle plate, and the middle plate and the frame 121 which are integrally formed are referred to as a middle frame. The display screen assembly 11 may be fixedly connected with the frame 121 or the middle plate through for example the dispensing process. As illustrated in FIG. 2, the frame 121 is substantially rectangular, and the frame 121 includes a top-side frame 1213, a bottom-side frame 1215, a first lateral-side frame 1217 and a second lateral-side frame 1219. Both the first lateral-side frame 1217 and the second lateral-side frame 1219 are connected between the top-side frame 1213 and the bottom-side frame 1215. The first lateral-side frame 1217 and the second lateral-side frame 1219 are provided opposite to each other. The top-side frame 1213, the first lateral-side frame 1217, the bottom-side frame 1215, and the second lateral-side frame 1219 are sequentially connected end to end, and provided at the periphery of the middle plate. Specifically, the various side frames may be in a right-angle connection or an arc-shaped transition connection. Further, when the frame is a metal frame, a plurality of metal frame antennas may be provided in the frame 121. Specifically, the metal frame antennas may be defined by a slit(s) provided on the frame.

Figure 3:
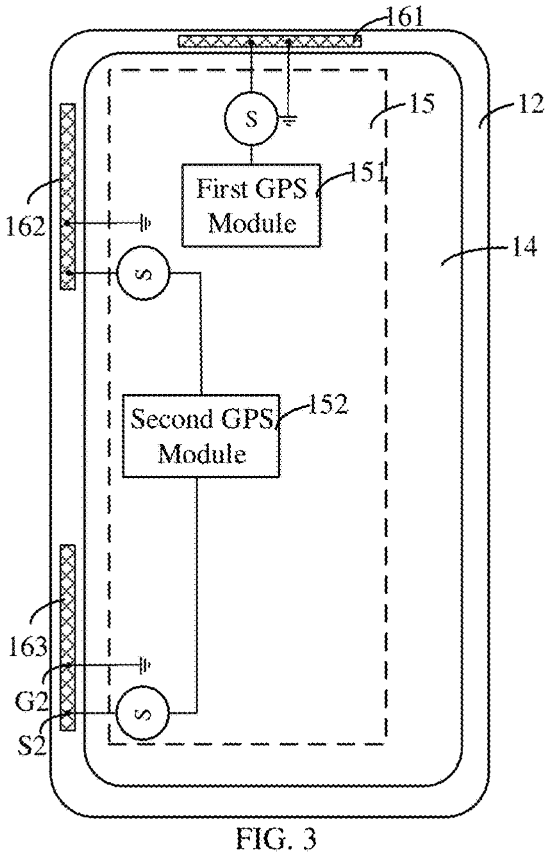
FIG. 3 is a structural schematic diagram illustrating an antenna assembly according to an embodiment.

The rear cover 123 is provided on a side of the display screen 111 that faces away from a display area of the display screen 111, and is connected with the frame 121. Further, the display screen assembly 11 and the rear cover 123 are located on opposite sides of the middle plate, respectively. The rear cover 123 may be made of a metal material such as an aluminum alloy, a magnesium alloy or stainless steel, or may be made of an insulating material, such as plastic, glass, ceramic, leather, denim, or bamboo. Further, the rear cover 123 is connected with the frame 121 to define an accommodating cavity, which is a mounting space, for mounting electronic components such as a battery, a motherboard, and a camera module of the electronic device. As illustrated in FIG. 3, electronic components, such as a processor, a storage unit, a power management module, a baseband chip, a camera, a sensor, and a receiver, of the electronic device are integrated on a main board 14.

The main board 14 is provided on the side of the display screen 111 that faces away from the display area, and the main board 14 may be fixedly connected to the frame through a structural member such as a screw. The main board 14 may be a printed circuit board (PCB) or a flexible printed circuit (FPC). A part of a radio frequency circuit for processing radio frequency signals may be integrated on a substrate of the main board 14, and a controller capable of controlling operation of the electronic device and the like may also be integrated on the main board. The radio frequency circuit includes, but is not limited to, an antenna assembly, at least one amplifier, a transceiver, a coupler, a low noise amplifier (LNA), a duplexer, and the like. In addition, the radio frequency circuit may further communicate with a network and other devices through wireless communication. The wireless communication may use any communication standard or protocol, including but not limited to Global System for Mobile communication (GSM), General Packet Radio Service (GPRS), Code Division Multiple Access (CDMA), Wideband Code Division Multiple Access (WCDMA), Long Term Evolution (LTE), Global Positioning System (GPS), email, Short Messaging Service (SMS), and the like.

The embodiments of the present disclosure provide an antenna assembly, and the antenna assembly may include the foregoing housing 12, a radio frequency circuit 15, and a plurality of antennas provided on the housing 12. The antennas provided on the housing 12 may include at least a first antenna 161 for radiating a first radio frequency signal at a GPS L1 frequency band, and a plurality of antennas for radiating a second radio frequency signal at a GPS L5 frequency band, for example, a second antenna 162 and a third antenna 163. In the embodiments of the present disclosure, the first antenna 161 may be referred to as a GPS L1 antenna, and each of the second antenna 162 and the third antenna 163 may be referred to as a GPS L5 antenna. Each of the first antenna 161, the second antenna 162, and the third antenna 163 may be one of a metal frame antenna, an FPC antenna, and a Laser-Direct-structuring (LDS) antenna. The FPC antenna refers to a radiator provided on the FPC, and the FPC antenna may be fixed on a non-appearance surface of the rear cover 123 through for example bonding, embedding, or welding. The LDS antenna refers to a radiator that is directly plated, through a laser technology, on the non-appearance surface of the rear cover 123 made of an insulating material.

As illustrated in FIG. 3, the radio frequency circuit 15 may include a first GPS module 151 and a second GPS module 152. The first GPS module 151 is connected with the first antenna 161, and may be configured to support control over receipt and transmission of the first radio frequency signal at the GPS L1 frequency band. For example, the first GPS module 151 includes, but is not limited to, a power amplifier, a filter, a low noise amplifier, a radio frequency switch, and the like. The second GPS module 152 is switchable between being connected to the second antenna 162 and being connected to the third antenna 163. When the second GPS module 152 is connected to any one antenna (the second antenna 162 or the third antenna 163), a target antenna may be determined based on network information of the received second radio frequency signal, and a radio frequency path between the target antenna and the second GPS module 152 may be controlled to be switched on, where the target antenna is one of the second antenna 162 and the third antenna 163.

The network information may include original and processed information associated with the wireless performance metrics of the received antenna signal, such as received power, transmitted power, reference signal received power (RSRP), reference signal received quality (RSRQ), received signal strength indication (RSSI), signal to noise ratio (SNR), rank of a MIMO channel matrix, carrier to interference plus noise ratio (RS-CINR), frame error rate, bit error rate, channel quality measurements based on signal quality data (such as Ec/lo or c/No data), information regarding to whether a response (reply) corresponding to a request from a mobile terminal is being received from a base station, information regarding to whether a network access procedure is successful, and so on.

For convenience of description, in the embodiments of the present disclosure, it is illustrated by taking, as an example, a case where the network information is received signal strength indication. When the second GPS module 152 is connected to the second antenna 162, the second GPS module 152 may measure the received signal strength indication of the second radio frequency signal received by the second antenna 162, and compare the received signal strength indication with a preset value. If the received signal strength indication is lower than the preset value, it may be determined that the second antenna 162 is blocked. In this case, the third antenna 163 may be recognized as the target antenna, and a radio frequency path between the second GPS module 152 and the third antenna 163 may be controlled to be switched on, and then the unblocked third antenna 163 is used to receive and transmit the second radio frequency signal at the GPS L5 frequency band, so as to improve the performance of the second radio frequency signal at the GPS L5 frequency band.

In the embodiments of the present disclosure, the antenna assembly includes the first antenna 161 for radiating a signal at the GPS L1 frequency band (1575 MHz), as well as the second antenna 162 and the third antenna 163 each for radiating a signal at the GPS L5 frequency band (1175 MHz). GPS antennas of two frequency bands are used in the antenna assembly, in which the first antenna 161 is assisted by the second antenna 162 and the third antenna 163, and the positioning accuracy can be improved. In addition, two GPS L5 antennas each configured to radiate a signal at the GPS L5 frequency band are provided, this can avoid a case in the related technology that the GPS L5 antenna fails to work when the user holds the electronic device, and can effectively increase the radiation efficiency of the GPS L5 antenna. Therefore, the GPS positioning accuracy of the antenna assembly can be improved.

In one embodiment, the rear cover 123 is an insulating rear cover, for example, the rear cover 123 is made of a plastic material, a ceramic material, a glass material, a leather material, or the like. The first antenna 161 is an FPC antenna attached onto the non-appearance surface of the rear cover 123, or is an LDS antenna provided on the non-appearance surface of the rear cover 123 through a laser technology. The first antenna 161 is provided close to the top-side frame 1213. The FPC antenna and the LDS antenna are simple in arrangement and convenient to install.

Figure 4:
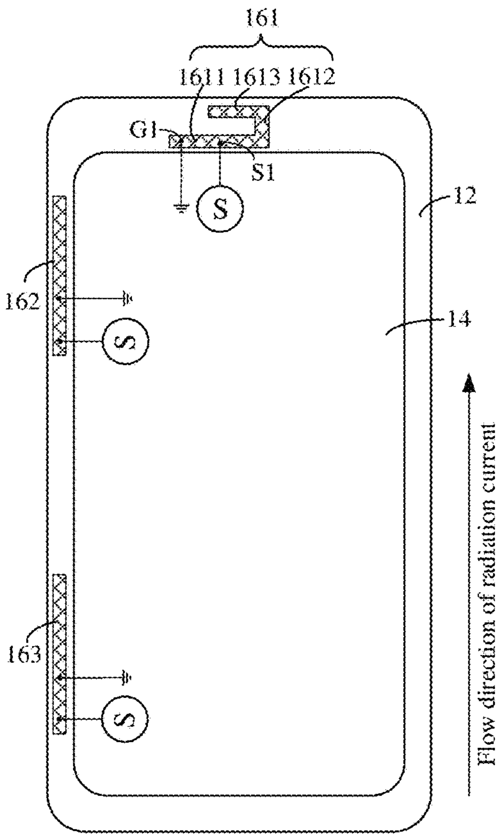
FIG. 4 is a structural schematic diagram illustrating an antenna assembly according to another embodiment.

In one embodiment, the radiator of the first antenna 161 may be in a straight shape, a bent shape or a curved shape, and the curved shape may include at least a spiral shape, an S shape, a W shape, or the like. In the embodiments of the present disclosure, as illustrated in FIG. 4, for easy of description, it is illustrated by taking, as an example, a case where the radiator of the first antenna 161 is in a bent shape. Specifically, the radiator of the first antenna 161 includes a first radiating portion 1611, a second radiating portion 1612 and a third radiating portion 1613 that are sequentially connected, where each of the first radiating portion 1611 and the third radiating portion 1613 is provided in parallel to the top-side frame. The second radiating portion 1612 is connected with each of the first radiating portion 1611 and the third radiating portion 1613. In the embodiments of the present disclosure, the second radiating portion 1612 may be connected to any position of the third radiating portion 1613 and the first radiating portion 1611. Exemplary, the second radiating portion 1612 may be connected to any one end of the third radiating portion 1613, and the second radiating portion 1612 may be connected to any one end of the first radiating portion 1611. Further, the second radiating portion 1612 is connected to one end of the first radiating portion 1611 and one end of the third radiating portion 1613, and the second radiating portion 1612 may be perpendicular to the first radiating portion 1611 and the third radiating portion 1613.

Figure 5:
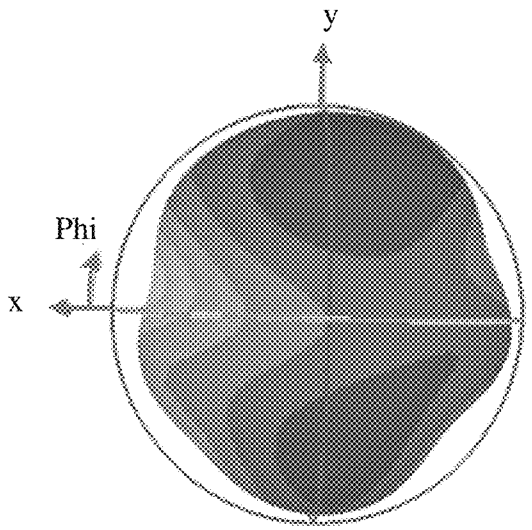
FIG. 5 and FIG. 6 each are a simulation schematic diagram illustrating three-dimensional radiation of a first antenna illustrated in FIG. 4.
Figure 6:
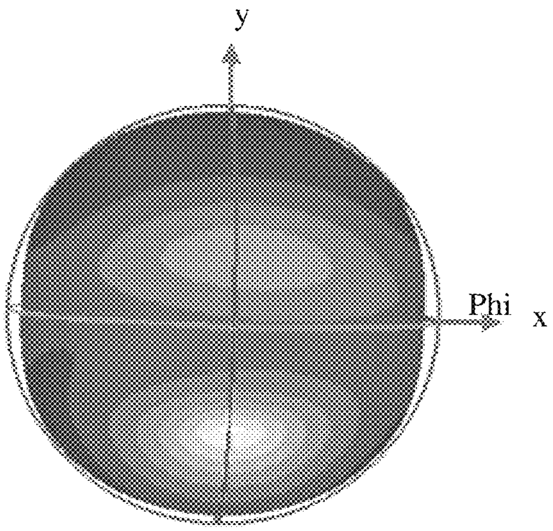

The third radiating portion 1613 is provided close to the top-side frame, and the first radiating portion 1611 is provided thereon with a first feeding point S1 and a first grounding point G1 that is grounded. Specifically, the first feeding point S1 may be connected with the first GPS module 151, and configured to receive a first feeding current output by the first GPS module 151; and the first feeding current is fed to the first radiating portion 1611 through the first feeding point S1. Since the first feeding point S1 is provided on the first radiating portion 1611 that is away from the top-side frame, the radiation current of the first antenna 161 flows in a direction from the bottom-side frame to the top-side frame, that is, the radiation current of the first antenna 161 flows upward, and there is a good upward radiation effect. The free space efficiency and the upper hemisphere efficiency of the first antenna 161 are illustrated in Table 1, and a perspective view illustrating the three-dimensional radiation of the first antenna 161 is presented in FIG. 5 and FIG. 6.

TABLE 1 the free space efficiency and the upper hemisphere efficiency of the first antenna 161 radiating a signal at a preset frequency.

| Frequency (MHz) | Free Space Efficiency (dB) | Upper Hemisphere Efficiency (dB) |
|---|---|---|
| 1550 | −6.09 | −10.34 |
| 1555 | −5.74 | −9.11 |
| 1560 | −5.29 | −8.68 |
| 1565 | −5.04 | −8.32 |
| 1570 | −4.96 | −8.12 |
| 1575 | −4.5 | −7.5 |
| 1580 | −4.71 | −7.69 |
| 1585 | −4.75 | −7.72 |
| 1590 | −5.02 | −7.94 |
| 1595 | −5.4 | −8.25 |
| 1600 | −5.73 | −8.88 |
| 1605 | −6.05 | −9.16 |
| 1610 | −6.34 | −9.64 |
| 1615 | −6.76 | −10.68 |
| 1620 | −6.92 | −11.03 |

As can be seen, the free space efficiency of the first antenna 161 is −4.5 dB, the upper hemisphere efficiency thereof is −7.5 dB, and the upper hemisphere efficiency accounts for 50%. The satellite is located on space, and by improving the upper hemisphere radiation efficiency of the GPS L1 antenna, and the upper hemisphere directivity of the GPS L1 antenna can be improved. When the satellite transmits a signal, the signal is transmitted in space and is interfered by various other scene signals; the signal of the antenna assembly corresponds to the signal of satellite, and the GPS L1 antenna (a directional antenna, whose beam points upward) having good upper hemisphere directivity enables the signal reception capability to be significantly improved, in which the energy is concentrated on the upper hemisphere and a strong anti-interference capability is enabled. Therefore, the positioning quality obtained by searching a satellite is greatly improved. In addition, two GPS L5 antennas are provided to assist the GPS L1 antenna, and the GPS positioning accuracy of the electronic device can be improved.

It is notable that the shape of the radiator of the first antenna 161 is not limited to the above illustration, and it may also be other shapes. The parallel arrangement may mean that an angle between the first radiating portion 1611 and the third radiating portion 1613 is less than or equal to 5 degrees, and the perpendicular arrangement may mean that an angle between the first radiating portion 1611 and the second radiating portion 1612 is within a preset range, for example, between 85 degrees and 95 degrees.

Figure 7:
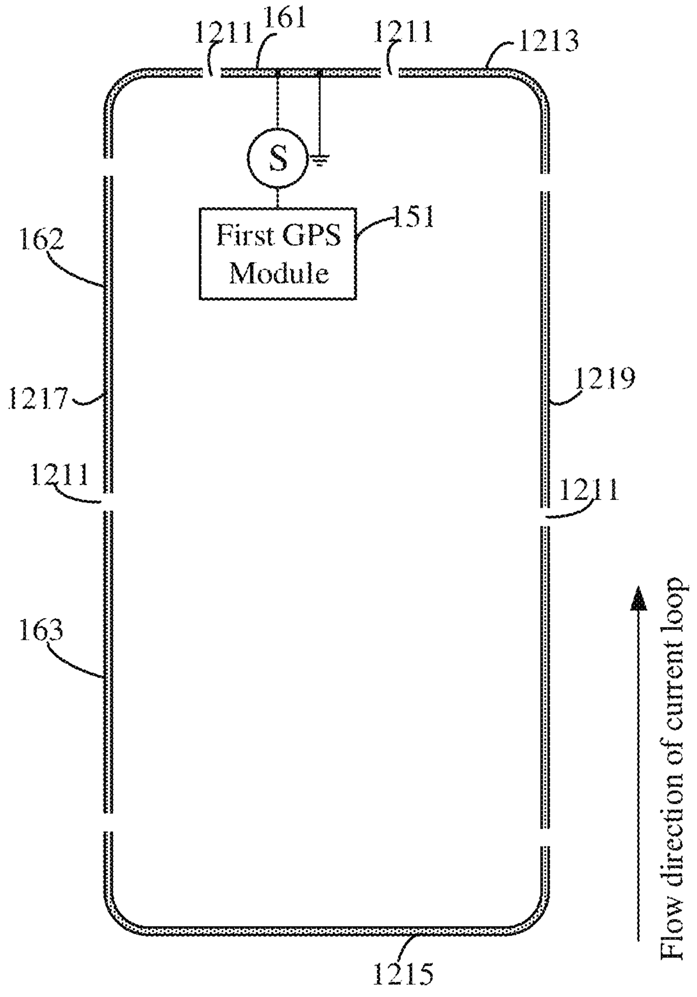
FIG. 7 is a structural schematic diagram illustrating an antenna assembly according to a further embodiment.

As illustrated in FIG. 7, in one embodiment, when the frame is a conductive frame, the first antenna 161 may also be a metal frame antenna, that is, the first antenna 161 may be the metal frame antenna provided on the top-side frame 1213. The top-side frame 1213 is provided with a slit(s) 1211 to divide the top-side frame 1213 into a plurality of top conductive branches. The first antenna 161 is provided on at least one of the top conductive branches, and a first feeding point configured to be connected with a feeding source and a first grounding point configured to be grounded are also provided on this top conductive branch. Specifically, the first feeding point may be connected with the first GPS module 151 and configured to receive a first feeding current output by the first GPS module 151; and the first feeding current is fed to the top conductive branch through the first feeding point, so that the top conductive branch may radiate the first radio frequency signal.

In the embodiments of the present disclosure, a specific structure of the first antenna 161 is not limited to the foregoing illustration, and it may also be an antenna of other types.

As illustrated in FIG. 7, in one embodiment, the second antenna 162 is provided on the first lateral-side frame 1217 or the second lateral-side frame 1219 at a position close to the top-side frame 1213, and the third antenna 163 is provided on the first lateral-side frame 1217 or the second lateral-side frame 1219 at a position close to the bottom-side frame 1215. The radiation current of the second antenna 162 and the radiation current of the third antenna 163 all flow in the direction from the bottom-side frame to the top-side frame. The position of the lateral-side frame close to the top-side frame 1213 may be understood as an upper half part of the lateral-side frame of the electronic device, and the position of the lateral-side frame close to the bottom-side frame may be understood as a lower half part of the lateral-side frame of the electronic device. That is, the second antenna 162 may be provided on the upper half part of the lateral-side frame of the electronic device, and the third antenna 163 may be provided on the lower half part of the lateral-side frame of the electronic device. The second antenna 162 and the third antenna 163 may be provided on a same lateral-side frame of the electronic device, or may be provided on different lateral-side frames. In the embodiments of the present disclosure, a slit 1211 may be provided in the lateral-side frame, so that the lateral-side frame may be divided into the upper half part of the lateral-side frame and the lower half part of the lateral-side frame. The slit 1211 may be provided in an intermediate region of the first lateral-side frame 1217, or in an intermediate region of the second lateral-side frame 1219. The intermediate region of the first lateral-side frame 1217 may be understood as a region of the first lateral-side frame 1217 that is at a distance of ⅓ to ⅔ of the length of the first lateral-side frame 1217 from the top-side frame. The intermediate region of the second lateral-side frame 1219 may be understood as a region of the second lateral-side frame 1219 that is at a distance of ⅓ to ⅔ of the length of the second lateral-side frame 1219 from the top-side frame.

In the embodiments of the present disclosure, the second antenna 162 is provided on the upper half part of the lateral-side frame of the electronic device and the third antenna 163 is provided on the lower half part of the lateral-side frame of the electronic device, that is, two GPS L5 antennas are respectively provided on the upper half part of the lateral-side frame and the lower half part of the lateral-side frame. When the antenna assembly is applied to the electronic device, if the electronic device is hold in landscape, the second antenna 162 and the third antenna 163 are not completely blocked. In addition, when the user holds the upper half part of the lateral-side frame or the lower half part of the lateral-side frame of the electronic device with one hand, there is always one GPS L5 antenna that may work normally. Therefore, the antenna assembly provided in the embodiments of the present disclosure can avoid a case in the related art that the GPS L5 antenna fails to work when the electronic device is hold by the user, and can effectively increase the upper hemisphere radiation efficiencies of the second antenna 162 and the third antenna 163, and then improve the GPS positioning accuracy of the antenna assembly.

Figure 8:
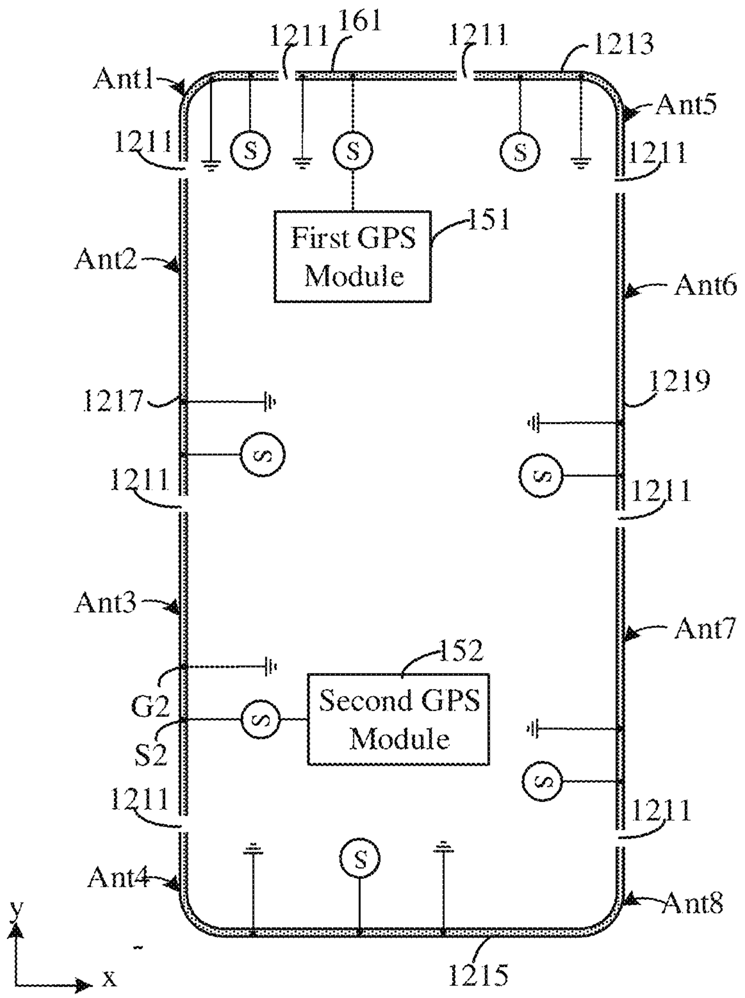
FIG. 8 is a structural schematic diagram illustrating an antenna assembly according to yet a further embodiment.

As illustrated in FIG. 8, in one embodiment, the frame is a conductive frame, and at least one of the first lateral-side frame 1217 and the second lateral-side frame 1219 is provided with slits 1211 to divide the metal frame into a plurality of side conductive branches. The second antenna is provided on a side conductive branch close to the top-side frame 1213, and the third antenna is provided on a side conductive branch close to the bottom-side frame. Exemplary, three slits 1211 may be provided in the first lateral-side frame 1217, and they may divide the first lateral-side frame 1217 into four first side conductive branches. Among the four first side conductive branches, two first side conductive branches close to the top-side frame 1213 may use as the upper half part of the lateral-side frame of the electronic device, and two first side conductive branches close to the bottom-side frame may use as the lower half part of the lateral-side frame of the electronic device. Exemplary, in a direction from the top-side frame 1213 to the bottom-side frame, four antennas such as a fourth antenna, a fifth antenna, a sixth antenna, and a seventh antenna may be provided on the four first side conductive branches respectively, in which the fourth antenna may be denoted as Ant1, the fifth antenna may be denoted as Ant2, the sixth antenna may be denoted as Ant3, and the seventh antenna may be denoted as Ant4. The antenna Ant1 is a WiFi antenna for radiating a WiFi signal. The antenna Ant2 is a cellular antenna for radiating a 4G or 5G signal, or a GPS L5 antenna for radiating a signal at a GPS L5 frequency band. The antenna Ant3 is a cellular antenna for radiating a 4G or 5G signal, or a GPS L5 antenna for radiating a signal at the GPS L5 frequency band. The antenna Ant4 is a cellular antenna for radiating a 4G or 5G signal. When the antenna Ant2 is a GPS L5 antenna for radiating a signal at the GPS L5 frequency band, the antenna Ant2 may serve as the second antenna mentioned above. When the antenna Ant3 is a GPS L5 antenna for radiating a signal at the GPS L5 frequency band, the antenna Ant3 may serve as the third antenna mentioned above.

Three slits 1211 may be provided on the second lateral-side frame 1219, and they may divide the second lateral-side frame 1219 into four second side conductive branches. Among the four second side conductive branches, two second side conductive branches close to the top-side frame 1213 may use as the upper half part of the lateral-side frame of the electronic device, and two second side conductive branches close to the bottom-side frame may use as the lower half part of the lateral-side frame of the electronic device. In the direction from the top-side frame 1213 to the bottom-side frame 1215, four antennas such as an eighth antenna, a ninth antenna, a tenth antenna, and an eleventh antenna may be provided on the four conductive branches of the second lateral-side frame 1219 respectively, in which the eighth antenna may be denoted as Ant5, the ninth antenna denoted as Ant6, the tenth antenna denoted as Ant7, and the eleventh antenna denoted as Ant8. The antenna Ant5 is a cellular antenna for radiating a 4G or 5G signal. The antenna Ant6 is a cellular antenna for radiating a 4G or 5G signal, or a GPS L5 antenna for radiating a signal at the GPS L5 frequency band. The antenna Ant7 is a cellular antenna for radiating a 4G or 5G signal, or a GPS L5 antenna for radiating a signal at the GPS L5 frequency band. The antenna Ant8 is a cellular antenna for radiating a 4G or 5G signal. When the antenna Ant6 is a GPS L5 antenna for radiating a signal at the GPS L5 frequency band, the antenna Ant6 may serve as the second antenna mentioned above. When the antenna Ant7 is a GPS L5 antenna for radiating a signal at the GPS L5 frequency band, the antenna Ant7 may serve as the third antenna mentioned above. The network type of the radio frequency signal radiated by the antenna Ant2 is different from the network type of the radio frequency signal radiated by the antenna Ant6. Exemplary, the antenna Ant2 is a cellular antenna, and the antenna Ant6 is a GPS L5 antenna; alternatively, the antenna Ant2 is a GPS L5 antenna, and the antenna Ant6 is a cellular antenna. Correspondingly, the network type of the radio frequency signal radiated by the antenna Ant3 is different from the network type of the radio frequency signal radiated by the antenna Ant7.

Further, the conductive branch where the antenna Ant4 is located and the conductive branch where the antenna Ant8 is located may all extend along the bottom-side frame 1215, and are connected to be a whole body. That is, the cellular antennas Ant4 and Ant8 may be configured to radiate signals at the same frequency band. It is notable that, in the embodiments of the present disclosure, the frequency bands of the cellular signals radiated by the plurality of cellular antennas may be partially the same, or completely different. Exemplary, the cellular signals may include a low-frequency signal, a medium-high frequency signal, and a Sub-6G frequency band signal. The number of the cellular antennas is not limited to the above illustration, and in the embodiments of the present disclosure, the cellular antennas may further include a plurality of cellular antennas provided on the top-side frame 1213 and the bottom-side frame 1215.

Further, each side conductive branch may be provided thereon with a second feeding point S2 for feeding a current signal and a second grounding point G2 for being grounded, so that each side conductive branch may use as a radiator to radiate a radio frequency signal at a different frequency band. For example, if the second feeding point S2 is connected to the second GPS module 152, the side conductive branch where the second feeding point S2 is provided is configured to radiate a signal at the GPS L5 frequency band; if the second feeding point S2 is connected to the WiFi module, the side conductive branch where the second feeding point S2 is provided is configured to radiate a WiFi signal; and if the second feeding point S2 is connected to a cellular mobile module, the side conductive branch which the second feeding point S2 is provided is configured to radiate a cellular signal which is the 4G or 5G signal.

Figure 9:
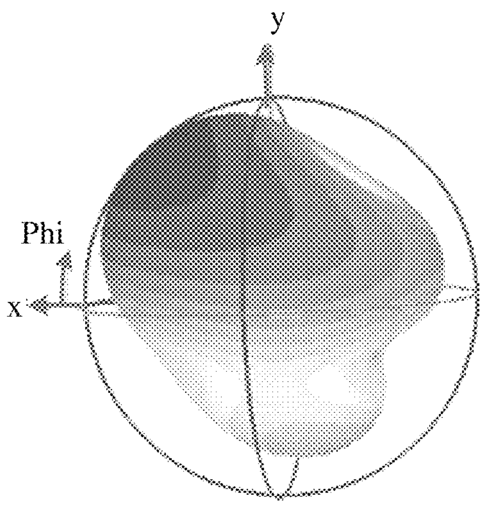
FIG. 9 and FIG. 10 each are a simulation schematic diagram illustrating three-dimensional radiation of a third antenna according to an embodiment.
Figure 10:
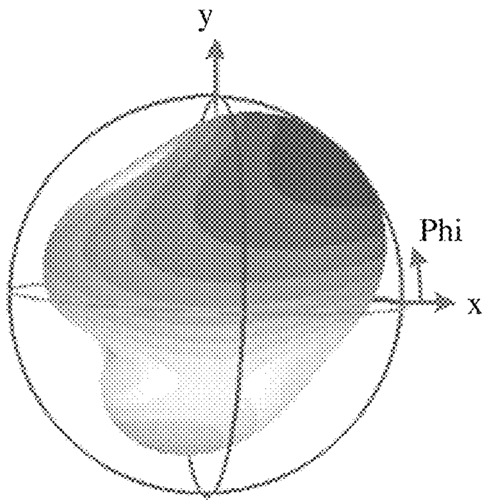

Specifically, the second feeding point S2 is provided on a side conductive branch close to the bottom-side frame 1215, and the second grounding point G2 is provided on the side conductive branch on a side of the second feeding point S2 away from the bottom-side frame 1215. Exemplary, it is illustrated by taking a first side conductive branch as an example, the second feeding point S2 on the first side conductive branch is connected with the second GPS module 152, that is, this first side conductive branch may be used as the radiator of the GPS L5 antenna. Although this GPS L5 antenna is provided on the lower half part of the lateral-side frame, the slit 1211 for the radiator of the GPS L5 antenna is provided in the middle position of the first lateral-side frame 1217, and the opening of the slit 1211 is located above, that is, the slit 1211 is provided at a position above both the second feeding point S2 and the second grounding point G2. Specifically, in a y-axis direction, the slit 1211 is provided at a position above both the second feeding point S2 and the second grounding point G2. Therefore, the radiation current in the third antenna 163 flows upward, that is, the radiation current flows in a direction from the bottom-side frame 1215 to the top-side frame 1213, and the upward radiation effect is good. The free space efficiency and the upper hemisphere efficiency of the third antenna 163 are illustrated in Table 2, and a perspective view illustrating the three-dimensional radiation of the third antenna 163 is presented in FIG. 9 (where the third antenna 163 is provided on the first lateral-side frame 1217) and FIG. 10 (where the third antenna 163 is provided on the second lateral-side frame 1219).

TABLE 2 the free space efficiency and the upper hemisphere efficiency of the third antenna 163 radiating a signal at a preset frequency.

| Frequency (MHz) | Free Space Efficiency (dB) | Upper Hemisphere Efficiency (dB) |
|---|---|---|
| 1150 | −8.97 | −12.07 |
| 1160 | −8.67 | −11.22 |
| 1170 | −8.5 | −11.02 |
| 1180 | −8.53 | −11.13 |
| 1190 | −8.66 | −11.85 |
| 1200 | −8.85 | −12.03 |

As can be seen, the free space efficiency of the third antenna 163 may be −8.5 dB, the upper hemisphere efficiency thereof may be −11 dB, and the upper hemisphere efficiency accounts for about 65%.

In the embodiments of the present disclosure, although the third antenna 163 is provided on the lower half part of the lateral-side frame, the third antenna 163 may enable a free space efficiency of −8.5 dB and an upper hemisphere efficiency of −11 dBm without affecting the other cellular antenna(s) and WiFi antenna(s). That is, the upper hemisphere efficiency of the third antenna accounts for a high proportion. The GPS L5 antenna having high upper hemisphere efficiency may assist the GPS L1 antenna, and the positioning accuracy can be further improved. In addition, since the slit 1211 of the third antenna 163 starts at the middle position of the first lateral-side frame 1217, when the antenna assembly is applied to the electronic device and the electronic device is normally held with one hand, the third antenna 163 could not be completely blocked, that is, the user does not block the end (that is, close to the top-side frame 1213) of the third antenna 163, and the influence on the third antenna 163 is small. Even if the user blocks a part of the third antenna 163, the second antenna 162 located on the upper half part of the lateral-side frame may be used to radiate the signal at the GPS L5 frequency band, which effectively increases the upper hemisphere radiation efficiency of the GPS L5 antenna. The satellite is located on space, and by improving the upper hemisphere radiation efficiency of the GPS L5 antenna, and the upper hemisphere directivity of the GPS L5 antenna can be improved. When the satellite transmits a signal, the signal is transmitted in space and is interfered by various other scene signals; the signal of the antenna assembly corresponds to the signal of the satellite, and the GPS L5 antenna (a directional antenna, whose beam points upward) having good upper hemisphere directivity enables the signal reception capability to be significantly improved, in which the energy is concentrated on the upper hemisphere and a strong anti-interference capability is enabled. Therefore, the positioning quality obtained by searching a satellite is greatly improved, and the GPS positioning accuracy of the antenna assembly can be improved.

In addition, in the embodiments of the present disclosure, a WiFi antenna, a plurality of cellular antennas (for example, a plurality of low-frequency antennas, a plurality of medium-high frequency antennas, a plurality of Sub-6G frequency band antennas), and GPS antennas of two frequency bands (for example, the first antenna 161, the second antenna 162, and the third antenna 163) may be provided on the conductive frame, in which performance of each antenna is good, mutual influence among the antennas is small, and frequency bands of global operators can be covered.

In one embodiment, the frame is an insulating frame, such as a plastic frame. Each of the second antenna 162 and the third antenna 163 may be an FPC antenna attached onto the non-appearance surface of the frame, or an LDS antenna provided on the non-appearance surface of the frame through a laser technology. Specifically, the radiator of the second antenna 162 and the radiator of the third antenna 163 may be straight. Specifically, the second antenna 162 may be provided on the non-appearance surface of the upper half part of the first lateral-side frame 1217 or the second lateral-side frame 1219, and the third antenna 163 may be provided on the non-appearance surface of the upper half part of the first lateral-side frame 1217 or the second lateral-side frame 1219. In the embodiments of the present disclosure, the non-appearance surface is opposite to the appearance surface, and the appearance surface may be understood as an exposed surface that may be intuitively felt by the user.

As illustrated in FIG. 4, in one embodiment, the rear cover 123 is an insulating rear cover, such as a plastic rear cover, a glass rear cover, a ceramic rear cover, or a leather rear cover. Each of the second antenna 162 and the third antenna 163 may be an FPC antenna or an LDS antenna attached onto a non-appearance surface of the rear cover 123. The FPC antenna or the LDS antenna may be provided at an edge position of the rear cover 123. Specifically, the second antenna 162 may be provided at an edge position of the insulating rear cover that is adjacent to the upper half part of the lateral-side frame. The third antenna 163 may be provided at an edge position of the insulating rear cover that is adjacent to the lower half part of the lateral-side frame.

In some embodiments of the present disclosure, each of the second antenna 162 and the third antenna 163 may be an FPC antenna or an LDS antenna, which is simple in structure and is convenient to install.

Figure 11:
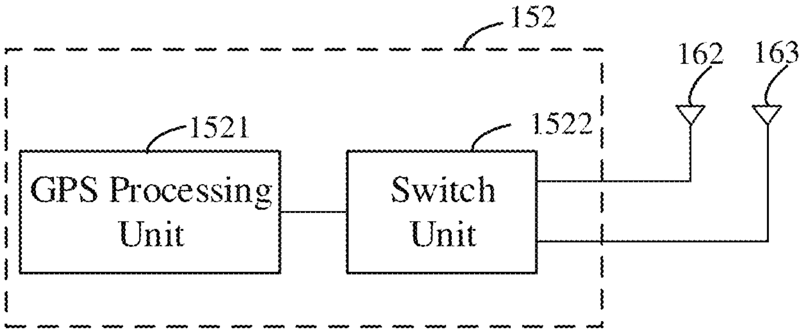
FIG. 11 is a schematic diagram of a framework of a second GPS module according to an embodiment.

Referring to FIG. 11, in one embodiment, the second GPS module 152 includes a GPS processing unit 1521 and a switch unit 1522. The GPS processing unit 1521 is configured to support transmission and receipt of the second radio frequency signal. Specifically, the GPS processing unit 1521 may include radio frequency components such as a power amplifier, a low noise amplifier, a filter, and a radio frequency switch, and may be configured to perform receiving process and the transmitting process for the received second radio frequency signal. The switch unit 1522 includes one first end and two second ends, where the first end is connected with the GPS processing unit 1521, one second end is connected with the second antenna 162 and another second end is connected with the third antenna 163. The switch unit 1522 may switch the GPS processing unit 1521 between being connected to the second antenna 162 and being connected to the third antenna 163. Specifically, the switch unit 1522 may be a single-pole double-throw switch, that is, an SPDT switch, where the single terminal of the SPDT switch is connected to the GPS processing unit 1521, one selecting terminal of the SPDT switch is connected to the second antenna 162 and another selecting terminal of the SPDT switch is connected to the third antenna 163.

Specifically, the GPS processing unit 1521 is further configured to determine a target antenna based on the network information of the received second radio frequency signal, and control the switch unit 1522 to switch on a radio frequency path where the target antenna is located. The second antenna 162 is provided on the upper half part of the housing 12, the third antenna 163 is provided on the lower half part of the housing 12, and each of the second antenna 162 and the third antenna 163 may be connected to the second GPS module 152 through the switch unit 1522.

The network information of a blocked GPS antenna attenuates largely, and the network information of the unblocked GPS antenna does not attenuate. When the switch unit 1522 selects to switch on a radio frequency path between the third antenna 163 and the GPS processing unit 1521, the GPS processing unit 1521 may measure first network information of a second radio frequency signal received by the third antenna 163, and compare the first network information with preset information. If the first network information is lower than the preset information, it indicates that the third antenna 163 is partially or completely blocked. In this case, the second antenna 162 may be used as the target antenna, and the switch unit 1522 is controlled to switch on a radio frequency path between the second antenna 162 and the GPS processing unit 1521. As such, the second antenna 162 is used to transmit and receive a signal at the GPS L5 frequency band, which assists the first antenna 161 in the GPS positioning, so as to improve the GPS positioning accuracy. It is notable that the preset information may be understood as network information of a second radio frequency signal that is received by the second antenna 162 when being not blocked. When the switch unit 1522 selects to switch on the radio frequency path between the second antenna 162 and the GPS processing unit 1521, the target antenna may also be determined based on the foregoing manner, and the switch unit 1522 is controlled to switch on the radio frequency path between the target antenna and the GPS processing unit 1521, so as to assist the first antenna 161 in the GPS positioning, and improve the GPS positioning accuracy.

In some implementations, the switch unit 1522 may further be controlled to cause a first radio frequency path between the third antenna 163 and the GPS processing unit 1521 and a second radio frequency path between the second antenna 162 and the GPS processing unit 1521 to be switched on in a time division manner. The GPS processing unit 1521 may determine first network information of a second radio frequency signal received by the third antenna 163 based on the first radio frequency path, and determine second network information of a second radio frequency signal received by the second antenna 162 based on the second radio frequency path. The value of the first network information is compared with the value of the second network information, and an antenna with the largest value of network information is determined as the target antenna for receipt.

It is notable that, in the embodiments of the present disclosure, the manner of determining the target antenna from the second antenna 162 and the third antenna 163 is not limited to the foregoing illustration, and the target antenna may also be determined in other manners.

In some embodiments, the switch unit 1522 selects to separately switch on the radio frequency path between the second antenna 162 located on the upper half part of the housing and the GPS processing unit, and the radio frequency path between the third antenna 163 located on the lower half part of the housing and the GPS processing unit, and the target antenna is determined based on the network information of the second radio frequency signals received respectively by the second antenna 162 and the third antenna 163. Then, the switch unit 1522 is controlled to switch on the radio frequency path between the target antenna and the GPS processing unit. This can avoid a case in the related art that the GPS L5 antenna fails to work when the electronic device is hold by the user, and can effectively increase the upper hemisphere radiation efficiency of the GPS L5 antenna, and then improve the GPS positioning accuracy of the antenna assembly.

The embodiments of the present disclosure further provide an electronic device, and the electronic device may include the antenna assembly in any one of the foregoing embodiments. The electronic device includes the first antenna 161 configured to radiate a signal at the GPS L1 frequency band (1575 MHz), as well as a second antenna 162 and a third antenna 163 each configured to radiate a signal at the GPS L5 frequency band (1175 MHz). GPS antennas of two frequency bands are used, in which the first antenna 161 is assisted by the second antenna 162 and the third antenna 163, and the positioning accuracy can be improved. In addition, two GPS L5 antennas each configured to radiate a signal at the GPS L5 frequency band are provided, this can avoid a case in the related art that the GPS L5 antenna fails to work when the electronic device is hold by the user, and can effectively increase the radiation efficiency of the GPS L5.

In addition, the second antenna 162 is provided on the upper half part of the lateral-side frame of the electronic device and the third antenna 163 is provided on the lower half part of the lateral-side frame of the electronic device. When the electronic device is hold in landscape, the second antenna 162 and the third antenna 163 are not completely blocked. When the user holds the upper half part of the lateral-side frame or the lower half part of the lateral-side frame of the electronic device with one hand, there is always one GPS L5 antenna that may work normally. Therefore, the antenna assembly provided in the embodiments of the present disclosure can avoid a case in the related art that the GPS L5 antenna fails to work when the electronic device is hold by the user, and can effectively increase the upper hemisphere radiation efficiency of the GPS L5 antenna. The satellite is located on space, and by improving the upper hemisphere radiation efficiency of the GPS L5 antenna, and the upper hemisphere directivity of the GPS L5 antenna can be improved. When the satellite transmits a signal, the signal is transmitted in space and is interfered by various other scene signals; the signal of the antenna assembly corresponds to the signal of the satellite, and the GPS L5 antenna (a directional antenna, whose beam points upward) having good upper hemisphere directivity enables the signal reception capability to be significantly improved, in which the energy is concentrated on the upper hemisphere part, and a strong anti-interference capability is enabled. Therefore, the positioning quality obtained by searching a satellite is greatly improved.

Data of the static satellite search quality tests is illustrated in Table 3, in which CN (Carrier to Noise) values of satellite search and a comparison with GPS antennas in the related art are presented.

TABLE 3

A table of data of the static satellite search quality tests
Static Satellite Search Quality Test

| | Types | East TOP4 | South TOP4 | West TOP4 | North TOP4 |
|---|---|---|---|---|---|
| Antenna assembly of the present disclosure | First antenna | 43.71 | 43.73 | 43.84 | 43.27 |
| | Third Antenna | 36.41 | 38.45 | 40.1 | 40.68 |
| Related Art 1 | First antenna | 43.37 | 42.62 | 43.1 | 43.12 |
| | Third Antenna | 30.96 | 25.3 | 20.73 | 31.31 |
| Related Art 2 | First antenna | 42.56 | 41.98 | 42.13 | 42.4 |
| | Third Antenna | 34.76 | 36.86 | 34.59 | 35.29 |

In the table, each of the related art 1 and the related art 2 has only one GPS L5 antenna, and the GPS L5 antenna is provided on the upper half part of the frame.

As can be seen from Table 3, radiation performance of both the first antenna 161 and the third antenna 163 provided in the embodiments of the present disclosure are better than the radiation performance of the GPS antennas in the related art, and there is an obvious advantage especially when the third antenna 163 is used to radiates a signal at the GPS L5 frequency band. The performance of the GPS L5 antenna is significantly improved, and the signal reception capability and the anti-interference capability are enhanced. Further, the electronic device may sense data of a pedestrian, such as an acceleration, an angular velocity, a magnetic force, and a pressure, during a traveling process, based on pedestrian dead reckoning (PDR), that is, an inertial measurement unit (IMU) is used in a non-beacon environment for such sensing. The electronic device obtains data of these information, and uses such data to estimate a walking trajectory, a position, and other information of the pedestrian. As such, a purpose of positioning and tracking the pedestrian is enabled, and the positioning accuracy can be effectively improved, thereby achieving "track-level" navigation.

Figure 12:
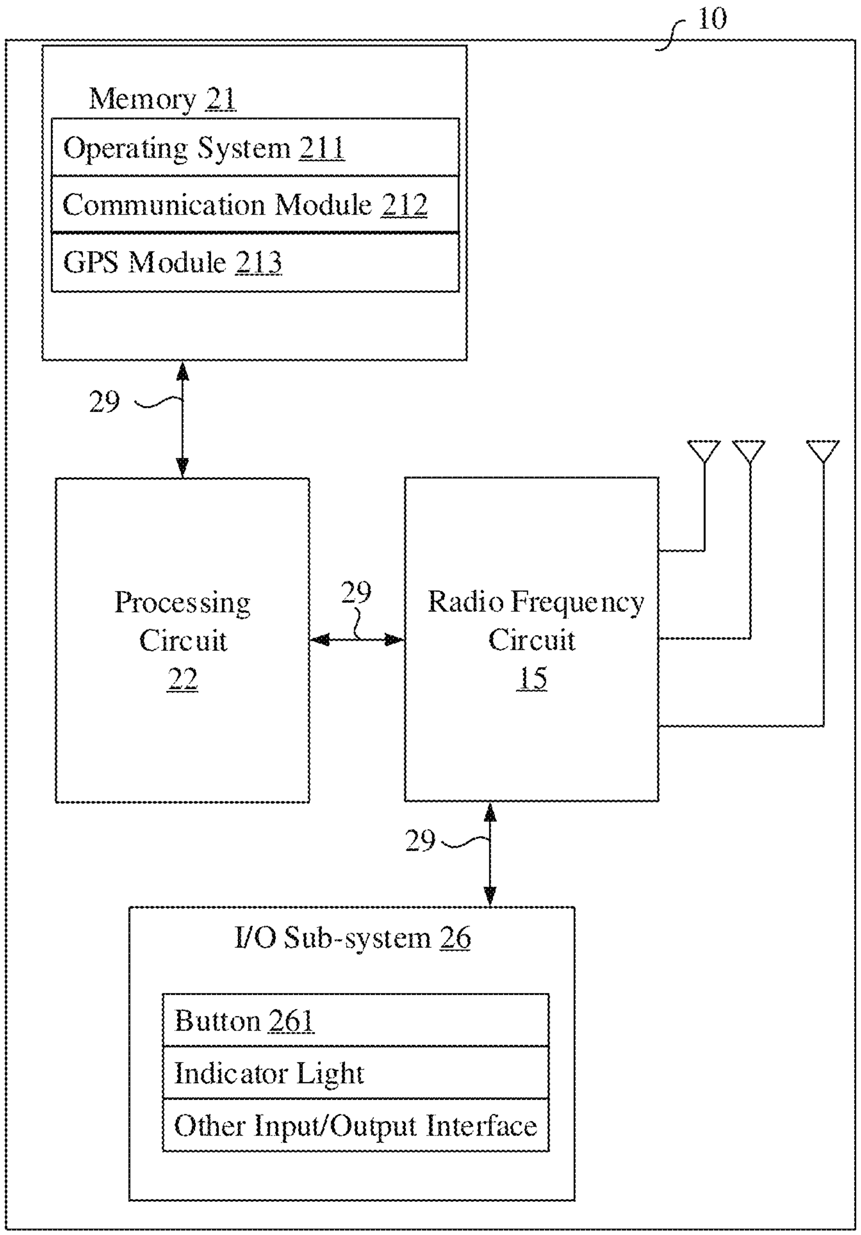
FIG. 12 is a structural schematic diagram illustrating an electronic device according to an embodiment.

As illustrated in FIG. 12, it is further illustrated by taking, as an example, a case where the electronic device is a mobile phone 10. Specially, as illustrated in FIG. 12, the mobile phone 10 may include a memory 21 (which optionally includes one or more computer-readable storage media), a processing circuit 22, a radio frequency circuit 15, and an input/output (I/O) sub-system 26. These components optionally communicate with each other over one or more communication buses or signal lines 29. A person skilled in the art may understand that the mobile phone 10 illustrated in FIG. 12 does not constitute a limitation on the mobile phone, and it may include more or fewer components than those illustrated in the figure, or combine some components, or arrange the components differently. The various components illustrated in FIG. 12 are implemented in hardware, software, or a combination of both hardware and software, including one or more signal processing circuits and/or specific integrated circuits.

The memory 21 optionally includes high-speed random access memory, and also optionally includes a non-volatile memory, such as one or more magnetic disk storage devices, flash memory devices, or other non-volatile solid state memory devices. Exemplary, software components stored in the memory 21 include an operating system 211, a communication module (or instruction set) 212, a global positioning system (GPS) module (or instruction set) 213, and the like.

The processing circuit 22 may be configured to control the operation of the mobile phone 10. The processing circuitry 22 may include one or more microprocessors, microcontrollers, digital signal processors, baseband processors, power management units, audio codec chips, application-specific integrated circuits, and the like.

The I/O sub-system 26 couples input/output peripherals on the mobile phone 10, such as keypad and other input control devices, to the peripheral interface. The I/O sub-system 26 optionally includes a touch screen, keys, a tone generator, an accelerometer (a motion sensor), an ambient light sensor and other sensors, a light emitting diode and other status indicators, data ports, and the like. For example, the user may control the operation of the mobile phone 10 by inputting commands via the I/O sub-system 26, and may use the output resources of the I/O sub-system 26 to receive status information and other outputs from the mobile phone 10. For example, the user may start the mobile phone or turn off the mobile phone by pressing a button 261.

The foregoing embodiments only illustrate several implementations of the present disclosure, and their descriptions are relatively specific and detailed, but they cannot be construed as limiting the scope of the present disclosure. It is notable for those skilled in the art that, several variations and modifications may be made by those skilled in the art without departing from the concept of the present disclosure, and all of them should fall within the protection scope of the present disclosure. Accordingly, the protection scope of the present disclosure is subject to the appended claims.

What is claimed is:

1. An antenna assembly, comprising:

a housing;

a first antenna, a second antenna and a third antenna, wherein the first antenna, the second antenna and the third antenna are provided on the housing; the first antenna is configured to radiate a first radio frequency signal at a Global Position System (GPS) L1 frequency band, and each of the second antenna and the third antenna is configured to radiate a second radio frequency signal at a GPS L5 frequency band; and a radio frequency circuit comprising:

a first GPS module, wherein the first GPS module is connected with the first antenna, and configured to support receipt and transmission of the first radio frequency signal; and a second GPS module, wherein the second GPS module is switchable between being connected to the second antenna and being connected to the third antenna, and configured to determine a target antenna based on network information of a received second radio frequency signal, and control a radio frequency path between the target antenna and the second GPS module to be switched on, the target antenna being one of the second antenna and the third antenna;

wherein the housing comprises a rear cover and a frame, the frame is connected with the rear cover to define an accommodating cavity; the frame comprises a top-side frame, a bottom-side frame, a first lateral-side frame and a second lateral-side frame, the top-side frame and the bottom-side frame are provided opposite to each other, each of the first lateral-side frame and the second lateral-side frame is provided between the top-side frame and the bottom-side frame, and the first lateral-side frame and the second lateral-side frame are provided opposite to each other;

the second antenna is provided on the first lateral-side frame or the second lateral-side frame at a position close to the top-side frame, and the third antenna is provided on the first lateral-side frame or the second lateral-side frame at a position close to the bottom-side frame; and a radiation current of the second antenna and a radiation current of the third antenna all flow in a direction from the bottom-side frame to the top-side frame.

2. The antenna assembly of claim 1, wherein the rear cover is an insulating rear cover, the first antenna is a flexible printed circuit (FPC) antenna attached onto a non-appearance surface of the rear cover, or a Laser-Direct-structuring (LDS) antenna provided on the non-appearance surface of the rear cover through a laser technology, and the first antenna is provided close to the top-side frame.

3. The antenna assembly of claim 2, wherein a radiator of the first antenna comprises a first radiating portion, a second radiating portion and a third radiating portion which are sequentially connected, each of the first radiating portion and the third radiating portion is provided parallel to the top-side frame, the third radiating portion is provided close to the top-side frame, and the first radiating portion is provided with a first feeding point and a first grounding point, the first feeding point being configured to be connected with the first GPS module, and the first grounding point being configured to be grounded, and the second radiating portion is connected to an end of the first radiating portion and an end of the third radiating portion, and the second radiating portion is perpendicular to each of the first radiating portion and the third radiating portion.

4. The antenna assembly of claim 1, wherein a radiator of the first antenna is in a straight strip shape, a bent shape, or a curved shape.

5. The antenna assembly of claim 1, wherein the frame is a conductive frame, and the top-side frame is provided with at least one slit to divide the top-side frame into a plurality of top conductive branches, and the first antenna is provided on one of the top conductive branches.

6. The antenna assembly of claim 1, wherein the frame is an insulating frame, and each of the second antenna and the third antenna is an FPC antenna attached onto a non-appearance surface of the lateral-side frame, or an LDS antenna provided on the non-appearance surface of the lateral-side frame through a laser technology.

7. The antenna assembly of claim 1, wherein the frame is a conductive frame, and at least one of the first lateral-side frame and the second lateral-side frame is provided with at least one slit to divide the at least one of the first lateral-side frame and the second lateral-side frame into a plurality of side conductive branches, the second antenna is provided on one of the side conductive branches that is close to the top-side frame, and the third antenna is provided on one of the side conductive branches that is close to the bottom-side frame.

8. The antenna assembly of claim 7, wherein the second antenna and the third antenna are provided on a same lateral-side frame.

9. The antenna assembly of claim 7, wherein an intermediate region of at least one of the first lateral-side frame and the second lateral-side frame is provided with the slit, and the intermediate region is a region of the respective lateral-side frame that is at a distance of ⅓ to ⅔ of a length of the respective lateral-side frame from the top-side frame.

10. The antenna assembly of claim 7, wherein each of the side conductive branches is provided with a second feeding point and a second grounding point, the second feeding point is provided close to the bottom-side frame, and the second grounding point is provided on a side of the second feeding point away from the bottom-side frame.

11. The antenna assembly of claim 7, wherein three slits are provided on the first lateral-side frame to divide the first lateral-side frame into four first side conductive branches, a fourth antenna, a fifth antenna, a sixth antenna, and a seventh antenna are sequentially provided, in a direction from the top-side frame to the bottom-side frame, on the four first side conductive branches respectively; the fourth antenna is a WiFi antenna configured to radiate a WiFi signal, the fifth antenna is a cellular antenna configured to radiate a 4G or 5G signal or a GPS L5 antenna configured to radiate a signal at the GPS L5 frequency band, the sixth antenna is a cellular antenna configured to radiate a 4G or 5G signal or a GPS L5 antenna configured to radiate a signal at the GPS L5 frequency band, and the seventh antenna is a cellular antenna configured to radiate a 4G or 5G signal.

12. The antenna assembly of claim 11, wherein three slits are provided on the second lateral-side frame to divide the second lateral-side frame into four second side conductive branches, an eighth antenna, a ninth antenna, a tenth antenna, and an eleventh antenna are sequentially provided, in the direction from the top-side frame to the bottom-side frame, on the four second side conductive branches respectively; the eighth antenna is a cellular antenna configured to radiate a 4G or 5G signal, the ninth antenna is a cellular antenna configured to radiate a 4G or 5G signal or a GPS L5 antenna configured to radiate a signal at the GPS L5 frequency band, the tenth antenna is a cellular antenna configured to radiate a 4G or 5G signal or a GPS L5 antenna configured to radiate a signal at the GPS L5 frequency band, and the eleventh antenna is a cellular antenna configured to radiate a 4G or 5G signal; a network type of a radio-frequency signal radiated by the fifth antenna is different from a network type of a radio-frequency signal radiated by the ninth antenna, and a network type of a radio-frequency signal radiated by the sixth antenna is different from a radio-frequency signal radiated by the tenth antenna.

13. The antenna assembly of claim 12, wherein the conductive branch where the seventh antenna is located and the conductive branch where the eleventh antenna is located each extend along the bottom-side frame, and are connected to be a whole body.

14. The antenna assembly of claim 1, wherein the second GPS module comprises:

a GPS processing unit, configured to support transmission and receipt of the second radio frequency signal; and a switch unit, wherein a first terminal of the switch unit is connected with the GPS processing unit, one second terminal of the switch unit is connected with the second antenna, and another second terminal of the switch unit is connected with the third antenna; and the switch unit is configured to switch the GPS processing unit between being connected to the second antenna and being connected to the third antenna;

the GPS processing unit is further configured to determine the target antenna based on the network information of the received second radio frequency signal, and control the switch unit to switch on a radio frequency path where the target antenna is located.

15. The antenna assembly of claim 1, wherein the network information comprises one of reference signal received quality, received signal strength indication, a signal-to-noise ratio, and a bit error rate.

16. An antenna assembly, comprising:

a housing;

a first antenna, a second antenna and a third antenna, wherein the first antenna, the second antenna and the third antenna are provided on the housing; the first antenna is configured to radiate a first radio frequency signal at a Global Position System (GPS) L1 frequency band, and each of the second antenna and the third antenna is configured to radiate a second radio frequency signal at a GPS L5 frequency band; and a GPS module, wherein the GPS module is switchable between being connected to the second antenna and being connected to the third antenna, and configured to determine a target antenna from the second antenna and the third antenna based on network information of a received second radio frequency signal, and control a radio frequency path between the target antenna and the GPS module to be switched on for radiation of the second radio frequency signal;

wherein the housing comprises a rear cover and a frame, the frame is connected with the rear cover to define an accommodating cavity; the frame comprises a top-side frame, a bottom-side frame, a first lateral-side frame and a second lateral-side frame, the top-side frame and the bottom-side frame are provided opposite to each other, each of the first lateral-side frame and the second lateral-side frame is provided between the top-side frame and the bottom-side frame, and the first lateral-side frame and the second lateral-side frame are provided opposite to each other;

the second antenna is provided on the first lateral-side frame or the second lateral-side frame at a position close to the top-side frame, and the third antenna is provided on the first lateral-side frame or the second lateral-side frame at a position close to the bottom-side frame; and a radiation current of the second antenna and a radiation current of the third antenna all flow in a direction from the bottom-side frame to the top-side frame.

17. The antenna assembly of claim 16, wherein the GPS module is further configured to:

measure network information of a second radio frequency signal received by one of the second antenna and the third antenna that is currently connected with the GPS module;

determine, as the target antenna, the one of the second antenna and the third antenna that is currently connected with the GPS module, in response to detecting that the measured network information is larger than or equal to a preset value; and determine, as the target antenna, another one of the second antenna and the third antenna that is currently not connected with the GPS module, in response to detecting that the measured network information is less than the preset value.

18. The antenna assembly of claim 16, wherein the GPS module is further configured to:

control one of the second antenna and the third antenna to be connected with the GPS module;

measure first network information of a second radio frequency signal received by the one of the second antenna and the third antenna;

switch the second GPS module from being connected with the one of the second antenna and the third antenna to being connected with another one of the second antenna and the third antenna;

measure second network information of a second radio frequency signal received by the another one of the second antenna and the third antenna;

determine, as the target antenna, the one of the second antenna and the third antenna, in responses to the first network information being larger than the second network information;

determine, as the target antenna, the another one of the second antenna and the third antenna, in responses to the second network information being larger than the first network information.

19. An electronic device, comprising:

a housing;

a first antenna, a second antenna and a third antenna, wherein the first antenna, the second antenna and the third antenna are provided on the housing; the first antenna is configured to radiate a first radio frequency signal at a Global Position System (GPS) L1 frequency band, and each of the second antenna and the third antenna is configured to radiate a second radio frequency signal at a GPS L5 frequency band; and a radio frequency circuit comprising:

a first GPS module, wherein the first GPS module is connected with the first antenna, and configured to support receipt and transmission of the first radio frequency signal; and a second GPS module, wherein the second GPS module is selectively connected to one of the second antenna and the third antenna, and configured to switch, based on network information of a received second radio frequency signal, between being connected to the second antenna and being connected to the second antenna;

wherein the housing comprises a rear cover and a frame, the frame is connected with the rear cover to define an accommodating cavity; the frame comprises a top-side frame, a bottom-side frame, a first lateral-side frame and a second lateral-side frame, the top-side frame and the bottom-side frame are provided opposite to each other, each of the first lateral-side frame and the second lateral-side frame is provided between the top-side frame and the bottom-side frame, and the first lateral-side frame and the second lateral-side frame are provided opposite to each other;

the second antenna is provided on the first lateral-side frame or the second lateral-side frame at a position close to the top-side frame, and the third antenna is provided on the first lateral-side frame or the second lateral-side frame at a position close to the bottom-side frame; and a radiation current of the second antenna and a radiation current of the third antenna all flow in a direction from the bottom-side frame to the top-side frame.

20. The electronic device of claim 19, wherein the rear cover is an insulating rear cover, the first antenna is an FPC antenna attached onto a non-appearance surface of the rear cover, or an LDS antenna provided on the non-appearance surface of the rear cover through a laser technology, and the first antenna is provided close to the top-side frame;

a radiator of the first antenna comprises a first radiating portion, a second radiating portion and a third radiating portion which are sequentially connected, each of the first radiating portion and the third radiating portion is provided parallel to the top-side frame, the third radiating portion is provided close to the top-side frame, and the first radiating portion is provided with a first feeding point and a first grounding point, the first feeding point being configured to be connected with the first GPS module, and the first grounding point being configured to be grounded, and the second radiating portion is connected to an end of the first radiating portion and an end of the third radiating portion, and the second radiating portion is perpendicular to each of the first radiating portion and the third radiating portion.

* * * * *